United States Patent [19]

En et al.

[11] 4,032,886

[45] June 28, 1977

[54] CONCATENATION TECHNIQUE FOR BURST-ERROR CORRECTION AND SYNCHRONIZATION

[75] Inventors: John En, Palatine; Albert Joseph Leitich, Chicago, both of Ill.

[73] Assignee: Motorola, Inc., Schaumburg, Ill.

[22] Filed: Dec. 1, 1975

[21] Appl. No.: 636,472

[52] U.S. Cl. .............. 340/146.1 AQ; 340/146.1 D
[51] Int. Cl.² ......................................... G06F 11/12
[58] Field of Search ............ 340/146.1 AQ, 146.1 D

[56] References Cited

UNITED STATES PATENTS

| | | | |
|---|---|---|---|
| 3,336,467 | 8/1967 | Frey, Jr. ..................... | 340/146.1 D |
| 3,381,273 | 4/1968 | Stark et al. ................. | 340/146.1 D |
| 3,463,911 | 8/1969 | Dupraz et al. .............. | 340/146.1 D |
| 3,648,237 | 3/1972 | Frey, Jr. et al. ............. | 340/146.1 D |
| 3,882,457 | 5/1975 | En ............................. | 340/146.1 AQ |

*Primary Examiner*—Charles E. Atkinson
*Attorney, Agent, or Firm*—James W. Gillman; James P. Hamley; Victor Myer

[57] ABSTRACT

A system for processing a digital information bit stream and generating a data bit stream. The processing includes convolutional burst error correction encoding which is capable of correcting burst errors of length 2B, where B is any positive integer. Inherent in such systems are the requirements of 2B and 5B zero level bits at the beginning, and end, respectively, of the data bit stream. The processing further includes encoding $n$ sync bits at the beginning of the data bit stream.

The improvement includes encoder apparatus for replacing the 2B zero bits with the $n$ sync bits; and, decoder apparatus for detecting a threshold number of sync bits and, in response thereto, replacing each sync bit with a zero bit. This improvement significantly reduces the number of bits otherwise required in the data bit stream.

Modifications render the system suitable for processing time diversity data transmissions, or for concatenating sync bits at the conclusion of each message in a fixed length, sequential message transmission system.

12 Claims, 6 Drawing Figures

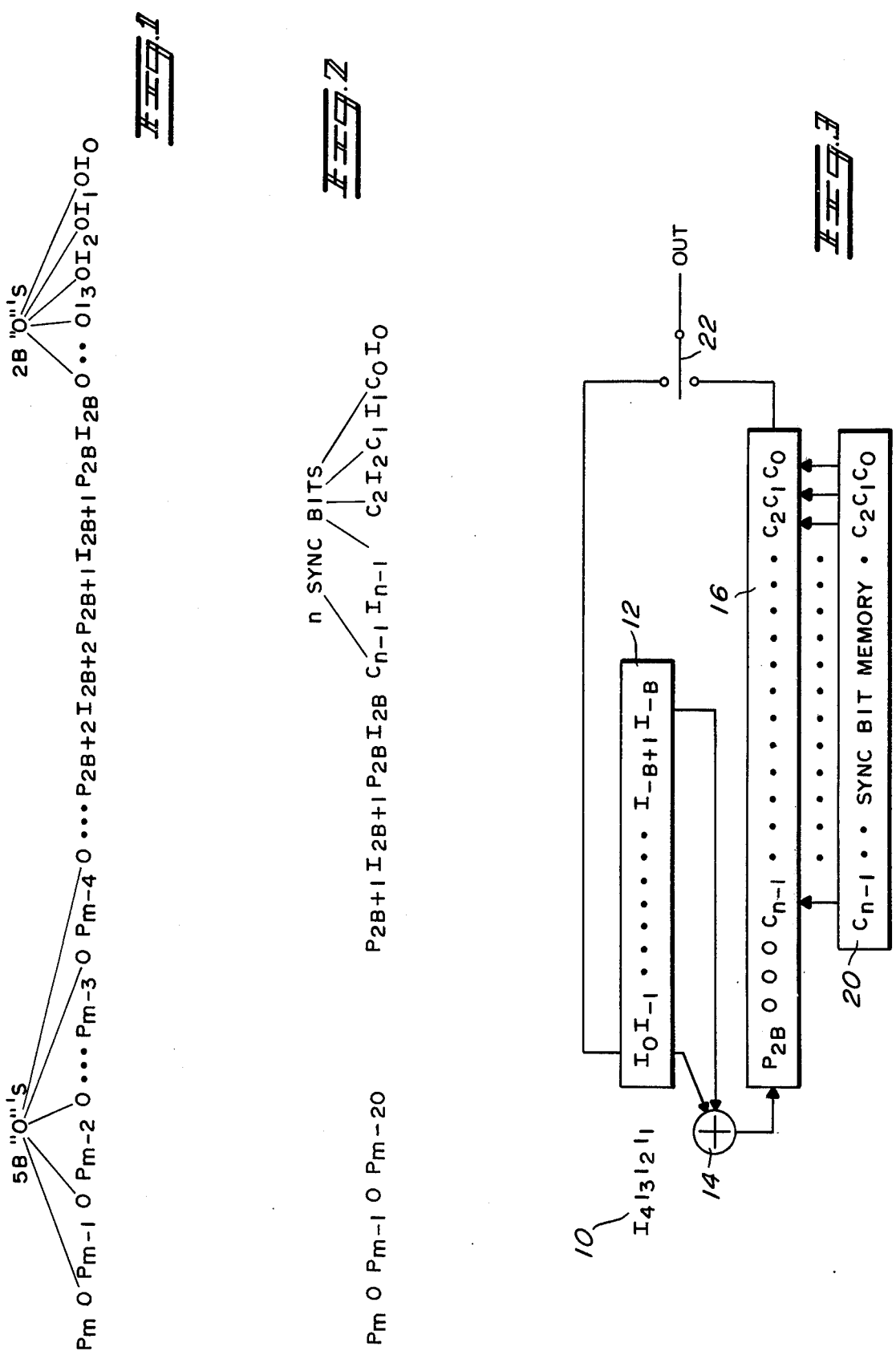

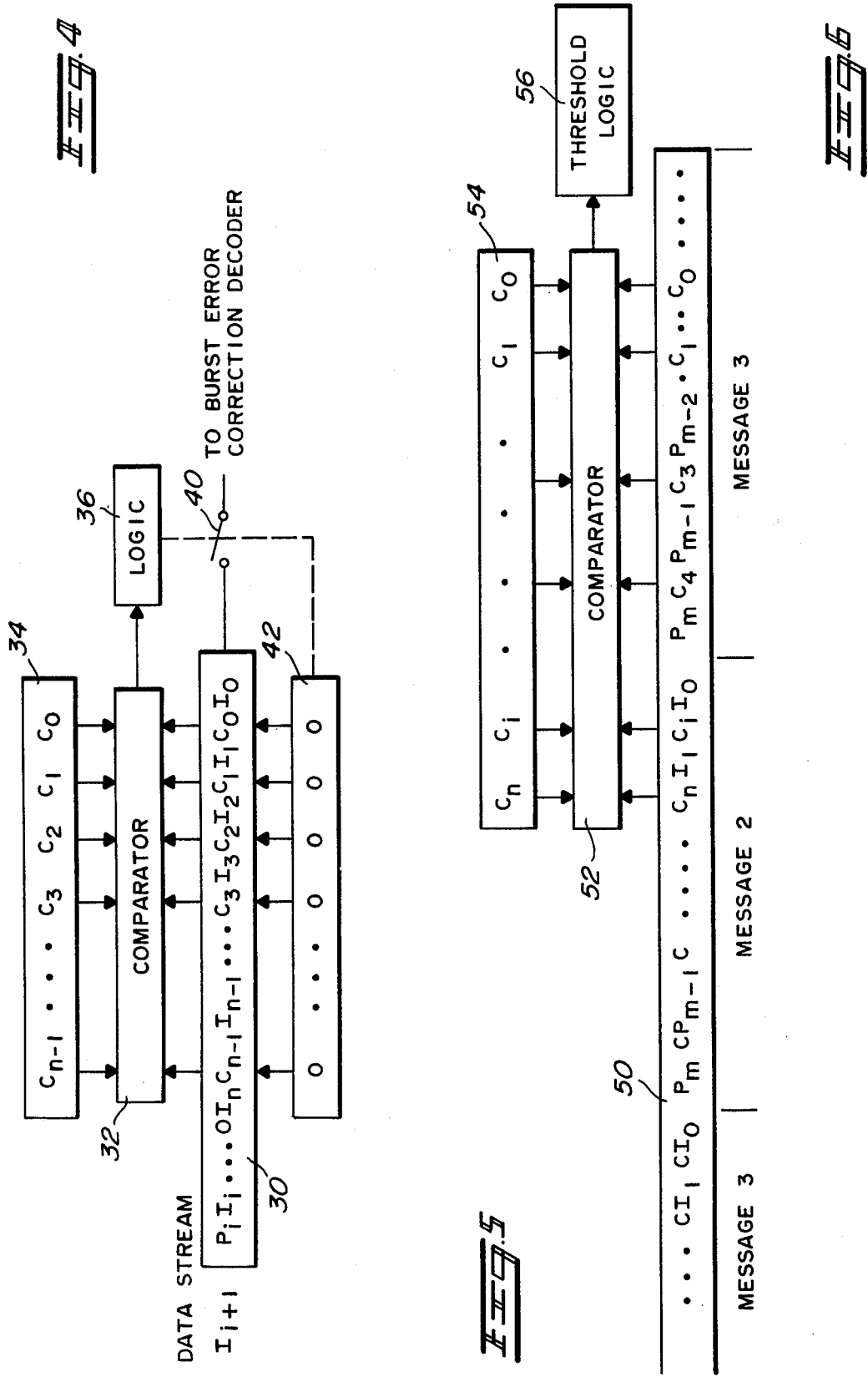

CONCATENATION TECHNIQUE FOR BURST-ERROR CORRECTION AND SYNCHRONIZATION

BACKGROUND OF THE INVENTION

This invention relates to the digital communication art and, more particularly, to a means for reducing the length of digital data streams by concatenating sync bits in place of burst error correction, reference level parity bits.

Digitally encoded communication systems are well known in the art. In such systems, an information bit stream is processed whereby a data bit stream is produced. In convolutional encoding systems, for example, parity bits are derived from the information bits and the data bit stream comprises the iterative transmission of information and parity bits. Such convolutional encoding schemes may correct for either random errors or burst errors, or both. A random error is, by definition, of short duration affecting a limited number of bits. Burst errors, however, may affect an entire sequence of bits. In convolutional encoding systems which correct for burst errors of length $kB$, the encoding requires a series of $kB$ reference level, or zero parity bits at the beginning of the data bit stream, and a similar sequence of $jK$ zero parity bits at the conclusion thereof, where $k$ and $j$ are predetermined integers. Another processing scheme uses time diversity data transmission. In this scheme the same information bits are transmitted twice, with a given number B, of zero level bits transmitted therebetween. In addition, some systems incorporate selective calling, contiuous transmission. Here, a series of messages of a known length are combined for a continuous transmission.

For all such digitally encoded transmission systems, it is necessary that the receiver contain a decoder for recovering the information bit stream from the data bit stream. It is essential that the decoder recognize a desired bit stream, and operate in synchronism therewith, for proper decoding. Commonly, preamble or sync bits are placed before the encoded message by the encoder thus notifying the decoder that a transmission is in progress. If there are $n$ sync bits preceding $m$ data bits, a total $(n + m)$ bits are required, which requires $(n + m)$ bits of transmission time. It is, of course, desirable to reduce transmission time to an absolute minimum.

OBJECTS OF THE INVENTION

It is an object of this invention, therefore, to provide an improved digital communication system which minimizes transmission time length.

A further object of the invention is to provide a means for concatenating sync bits into reference level parity bits in a convolutional, burst error correction system.

It is a further object of the invention to provide a means for concatenating sync bits in place of reference level bits in a time diversity transmission system.

An additional object of the invention is to provide a means for concatenating sync bits in place of reference level bits in selective calling, continuous transmission communication systems.

Briefly, according to the invention, an improved digital communication system encoder includes means for encoding an information bit stream and producing a data bit stream. The processing includes placing a predetermined number of reference level bits, e.g., zero bits, in the data bit stream. The data bit stream also contains a predetermined number, $n$, of sync bits. Unique encoder apparatus reduces the overall length of the data transmission by concatenating the $n$ sync bits in place of $n$ of the reference level bits.

The system further comprises a decoder which recovers the information bit stream from the data bit stream. The decoder is comprised of apparatus which recognizes a threshold number of received sync bits and responds by replacing the sync bits with reference level bits, thereby restoring the data bit stream for further encoder processing.

DESCRIPTION OF THE DRAWINGS

FIG. 1 illustrates a data bit stream comprised of convolutional, burst error encoding having predetermined zero level parity bits;

FIG. 2 illustrates the concatenation process, according to the invention, wherein $n$ sync bits replace $n$ of the zero level bits of the FIG. 1 data bit stream;

FIG. 3 illustrates a preferred embodiment of an encoder suitable for encoding the waveform shown in FIG. 2;

FIG. 4 illustrates a preferred embodiment of a decoder suitable for decoding the data bit stream shown in FIG. 2;

FIG. 5 illustrates a preferred concatenation encoder for use in a selective calling, continuous transmission system; and FIG. 6 illustrates a data bit stream, including blocks of zero bits, in a time diversity transmission system.

DESCRIPTION OF THE PREFERRED EMBODIMENT OF THE INVENTION

FIG. 1 illustrates a convolutional, burst error correction data bit stream. In this particular example, information bits have been processed through an encoding process whereby parity bits, equal to the modulo-2 sum of predetermined information bits, are iterated with the information bits. This particular scheme is capable of correcting burst errors having a length of 2B, if an error free segment of length 6B is received. The system requires that parity bits be delayed with respect to the information bits. Thus, the beginning of an encoded message contains 2B zero parity bits, so that every information bit is followed by a parity bit. The conclusion of the data bit stream contains 5B zero information bits. An encoder, suitable for producing the data bit stream of FIG. 1, is fully disclosed in U.S. Pat. No. 3,882,457, assigned to the same assignee as the present invention.

For proper recovery of the information bit stream at the decoder, a sequence of preamble or sync bits must be included at the beginning of the data bit stream. Commonly, this would be accomplished by adding a sequence of $n$ sync bits prior to the data stream shown in FIG. 1. This, of course, increases the length of the message, and thereby the length of time required for message transmission. To minimize bit stream length, and transmission time, an encoder according to the instant invention concatenates the sync bits in the data stream by replacing $n$ of the 2B zero bits, with sync bits. This is illustrated in FIG. 2.

FIG. 3 illustrates an improved encoder, according to the instant invention, which processes an information bit stream 10 and outputs a burst-error-correction-encoded, concatenated sync bit waveform shown in FIG. 2.

The information bit stream 10 is applied to the input of an information bit stream register 12. The register stores a sequence of the information bits. Parity bits, P, are produced by taking the modulo-2 sum of selected information bits, in the information bit register 12, by a modulo-2 adder 14. These parity bits are routed to a parity bit register 16, which is suitable for storing a sequence of parity bits. It should be understood that bits are shifted down both registers 12, 16 at a given clock rate. A sync bit memory 20 connects to the parity bit register 16. Once an information bit stream 10 is to be processed, the sync bit memory 20 transfers $n$ sync bits to the parity bit register 16. A switch 22, also operating at twice the clock rate, outputs the first input of the information bit register 12 followed by the final output of the parity bit register 16. For the first $2n$ data bits, the information bits and sync bits are transmitted alternately by switch 20 before information and parity bits are transmitted. The encoding process is seen to produce the waveform illustrated in FIG. 2, whereby $n$ of the 2B zero parity bits are replaced by the sync bits.

FIG. 4 illustrates a decoder system suitable for recognizing an incoming data bit stream, and replacing the data stream concatenated sync bits with zero level parity bits, thus producing a bit stream suitable for burst error correction. The data stream is applied to a data bit stream register 30, whereat the data bits are sequentially clocked down the register. A comparator 32 constantly monitors alternate data bits and compares these bits to a sync reference memory 34. When a given threshold level, $q$, of data bits match the sync memory produced bit, a control signal is generated by comparator 32 indicating that a data bit stream is being received. This control circuit activates logic circuitry 36 which, in turn, activates a switch 40 and a zero bit memory 42. The zero bit memory 42 contains zero parity bits, and, upon activation, replaces the concatenated sync bits with the zero level bits, thus restoring the burst error correction encoding, i.e., transforming the bit stream illustrates in FIG. 2 to the stream illustrated in FIG. 1. Also, logic 36 causes switch 40 to output the data bit stream register 30 for the length of the message. The stream is, in turn, passed to an error correction decoder (not shown). A suitable decoder is also shown in U.S. Pat. No. 3,882,457 which, as previously mentioned, is assigned to the same assignee of the present invention.

FIG. 5 illustrates a selective calling, continuous transmission communication scheme. Here, each message, comprised of convolutional burst error correction encoding, has a fixed length. The fixed length messages are continuously transmitted, with, as before, 2B zero parity bits at the beginning of the message, and 5B zero information bits at the message end. This particular system is capable of concatenating the sync bits in the data bit stream even if the number of sync bits $n$ exceeds the 2B preamble parity zero bits. This is accomplished by encoding some or all of the 5B zero information bits at the end of one message and 2B zero parity bits at the beginning of the next message, thus resulting in a data bit stream 50. This bit stream may be decoded in a manner similar to the decoder shown in FIG. 4, whereby a comparator 52 monitors the data bit stream 50, and compares it to a sync bit memory 54. The comparator 52 constantly looks for matches between the bits in the data bit stream 50 and the sync bits produced from the sync bit memory 54. When a threshold number of such matches occurs, threshold logic circuitry 56 synchronizes the decoder and replaces the sync bits with zero level bits, thus rendering the data bit stream suitable for burst error correction decoding.

The sync concatenation technique may be applied to a time diversity data transmission, as illustrated in FIG. 6. In time diversity data transmission, information bits are transmitted twice, with B bits of delay therebetween. Each information bit is followed by one of B zeros at the beginning of a message; and each of B zeros is followed by an information bit at the conclusion of each message. If the number of sync bits $n$ is less than B, the entire $n$ sync bits may be concatenated by replacing $n$ of the first B zero bits.

However, if $n$ is greater than B, and if the information length is fixed, with continuous message transmission, as in the selective calling system illustrated in FIG. 5, $n$ sync bits may replace both the last B zero's of the first signal, and the first B zero's of the second signal, thus shortening the transmission time without adding significant system complexity.

In summary, a system for reducing the number of bits in a digital communication data bit stream has been discussed, which system is particularly useful in convolutional burst encoded schemes, as well as time diversity and selective calling continuous transmission schemes.

While preferred embodiments of the invention have been described, it should be understood that many modifications and variations thereto are possible, all of which fall within the true spirit and scope of the invention.

For example, while a burst error correction scheme capable of correcting bursts up to length 2B, having 2B zero parity bits prior to, and 5B zero information bits subsequent to, the encoded message, has been shown, it should be understood that the concatenation technique, according to the instant invention, may be utilized in any such encoding scheme. That is, the present invention may be used in any encoding system wherein $kB$ zero bits precede the encoded message and $jB$ zero bits succeed the message, where $k$ and $j$ are predetermined integers.

We claim:
1. In a digital communication system, an encoder comprising:
   means for encoding an information bit stream and producing a data bit stream, said data bit stream comprising a predetermined number of reference level bits, said data bit stream further comprising a predetermined number $n$ of sync bits; said encoder further comprising concatenation means for replacing $n$ of said reference level bits with said sync bits.
2. The system of claim 1 further comprising a decoder for recovering said information bit stream from said data bit stream, said decoder comprising:
   means for recognizing a threshold number of said sync bits and, in response thereto, replacing said sync bits with reference level bits.
3. The system of claim 2 wherein the encoder further comprises means for convolutionally encoding said information bit stream with parity bits for correction of burst errors having a length as long as $kB$-bits, $kB$ of said parity bits occurring at the beginning of said data stream, $jB$ bits occurring at the conclusion of said data stream; where $k$ and $j$ are predetermined integers, and wherein the concatenation means includes means for replacing said $kB$ bits with said $n$ sync bits.

4. The system of claim 3 wherein the encoder further comprises:
an information bit register for storing a sequence of the information bits;
a parity bit generator for modulo-2 adding predetermined pairs of the information bits stored in the information bit register, each modulo-2 addition comprising a parity bit;
a parity bit register for storing a sequence of the parity bits;
a sync bit memory for producing said $n$ sync bits;
means for transferring said $n$ sync bits from said sync bit memory to said parity storage register responsive to a predetermined point in encoding said information bit stream; and
switching means for sequentially outputting predetermined bits from said information bit register and said parity bit register.

5. The system of claim 4 wherein the decoder further comprises:
a data stream register for storing a sequence of said data bit stream;
a sync bit reference memory for producing said $n$ sync bits;
comparator means for monitoring said data stream register and comparing said stored data bit stream sequence with said sync bit reference memory, said comparator producing a control signal when a minimum number, $q$ of said data bits match said sync reference memory produced bits;
first means responsive to said produced control signal for replacing said $n$ sync bits with reference level bits; and
second means responsive to said produced control signal for outputting said data stream register.

6. The system of claim 3 wherein said information bit stream is comprised of a series of messages, each message having a predetermined bit length,
the encoder further comprising means for replacing said $j$B bits with sync bits.

7. The system of claim 1 wherein the encoding means comprises time diversity data transmission encoding means for repeating the information bits after said predetermined number of reference level bits.

8. In a digital communication system wherein an information bit stream is convolutionally encoded in a data bit stream, said encoding providing the capability of correcting for burst errors of as many as $k$B successive bits, where $k$ is a predetermined integer, said burst error correction requiring that said data bit stream comprise $k$B reference level bits, said encoding also providing $n$ synchronization bits, the communication system also having a decoder for processing the data bit stream and recovering the information bit stream, the decoder requiring recognition of at least a threshold number, $q$, of said synchronized bits and further requiring at least $k$B reference level bits for correction of a burst error having as many as $k$B successive error bits, the improvement comprising:

said encoder further comprising means for replacing at least $q$ of said $k$B reference level bits with at least $q$ synchronization bits; and
said decoder further comprising means for recognizing said at least $q$ synchronization bits and, in response thereto, replace said $q$ synchronization bits with reference level bits.

9. The system of claim 8 wherein the encoder further comprises:
an information bit register for storing a sequence of the information bits;
a parity bit generator for modulo-2 adding predetermined pairs of the information bits stored in the information bit register, each modulo-2 addition comprising a parity bit;
a parity bit register for storing a sequence of the parity bits;
a sync bit memory for producing at least $q$ sync bits;
means for transferring said at least $q$ sync bits from said sync bits memory to said parity storage register responsive to a predetermined point in the encoding of said information bit stream; and
switching means for sequentially outputting predetermined bits in said information bit register and said parity bit register.

10. The system of claim 8 wherein the decoder further comprises:
a data stream register for storing a sequence of said data bit stream;
a sync bit reference memory for producing said $n$ sync bits;
comparator means for monitoring said data stream register and comparing said stored data bit stream sequence with said sync bit reference memory, said comparator producing a control signal when at least $q$ of said data bits match with said synchronization reference memory produced bits;
first means responsive to said produced control signal for replacing said at least $q$ synchronization bits with reference level bits; and
second means responsive to said produced control signal for outputting said data stream register.

11. The system of claim 8 wherein the encoding means replaces said $k$B reference level bits with $n$ synchronization bits.

12. The system of claim 8 wherein said information bit stream is comprised of a series of messages, each message having a predetermined bit length, and wherein the burst error correction encoding further requires a number $j$B of reference level bits at the conclusion of each message, where $j$ is a predetermined integer,
the encoder further comprising means for replacing a predetermined number of said $j$B bits with sync bits; and
the decoder further comprising means for recognizing a minimum number of said predetermined sync bits and, in response thereto, replacing said sync bits with reference level bits.

* * * * *